United States Patent Office 2,876,257
Patented Mar. 3, 1959

2,876,257

PRODUCTION OF TRIMESIC ACID

William G. Toland, San Rafael, Calif., assignor to California Research Corporation, San Francisco, Calif., a corporation of Delaware No Drawing. Application October 4, 1956
Serial No. 613,844

2 Claims. (Cl. 260—524)

This invention relates to a process for producing unsubstituted benzene polycarboxylic acids, more particularly it relates to a process in which a tetrasubstituted benzene is oxidized to give a benzene polycarboxylic acid product mixture containing a substantial proportion of 1,3,5-benzene tricarboxylic acid (trimesic acid).

This application is a continuation-in-part of my copending application Serial No. 369,541, filed July 21, 1953, now abandoned.

It has been found that substituted benzenes having at least three substituents attached to the benzene nucleus by a carbon to carbon bond and having at least two of the substituents in ortho-relationship to each other, may be oxidized to produce an unsubstituted benzene polycarboxylic acid having a number of carboxyl groups smaller than the number of said substituents by introducing the polysubstituted benzene, together with, (1) a water-soluble sulfate, (2) elemental sulfur or a sulfur compound containing sulfur at a valence below plus 6, and, (3) water into a reaction zone and there heating the mixture to a temperature above 500° F.

In particular, isodurene, a tetramethyl benzene having its methyl substituents in positions 1, 2, 3 and 5 on the benzene nucleus, so that at least two of these substituents are present in ortho-relationship to each other, and obtained in any suitable manner, for instance, from the $BF_3/HF$ catalyzed isomerization of durene, can be oxidized in accordance with the aforementioned oxidation process and yields an aromatic acid product mixture containing a substantial amount of trimesic acid, as shown in the following Example I.

EXAMPLE I 26.1 g. of isodurene was charged into a 2.5 liter autoclave together with 88.0 g. of ammonium sulfate, 22.0 g. of hydrogen sulfide and 1000 g. of water. The autoclave was sealed, its contents heated to 625° F. and maintained at this temperature with constant shaking for two hours. The final pressure on the autoclave recorded at that time was 2400 p. s. i. g. When the heat was turned off and the contents of the autoclave cooled to room temperature, reactor gases were bled through a caustic scrubber where about 10 g. of $H_2S$ was absorbed. The remaining product mixture was steam-stripped to eliminate $H_2S$ and free ammonia and filtered to separate sulfur, if any were present in the oxidation reaction. The mixture was then saponified with caustic and acidified with dilute HCl to a pH of about 1.0 and filtered cold. The filtrate was evaporated to dryness, and the remaining solid material was slurried with methanol, whereupon dry HCl gas was passed through the slurry. The resulting ester solution was distilled to remove methanol, and the residue extracted with ether and dried to leave 4.3 g. of a solid ester mixture which had a saponification equivalent of 90.0. Its trimesic acid content was 1.8 g., the remaining acids (1.8 g.) being a mixture of isophthalic and terephthalic acids. The filter cake, recovered from the filtration of the acidified oxidation product and weighing 25.8 g., was extracted with hot water and, on cooling, 10 g. of a solid organic acid material was collected (neutral equivalent 76.6). Of this material, 5.5 g. was trimesic acid and the remainder isophthalic acid. Some trimesic acid, calculated to weigh 4.2 g., remained in the aqueous solution. Conversion of isodurene was 100% complete. The total amount of trimesic acid formed was 11.55 g. (0.055 mol), while that of mixed phthalic acids (isophthalic and terephthalic) was 15.75 g. (0.09 mol), these amounts corresponding to a yield of 28.3 mol percent of the theory for trimesic acid and 48.7 mol percent for mixed isophthalic and terephthalic acids.

It is often preferred to obtain the desired trimesic acid by employing for the hereinbefore described oxidation organic acid mixtures formed by a partial oxidation of isodurene in a known manner, for instance, using air or oxygen, at temperatures and pressures and in the presence of catalysts, described in the art. Such product mixtures contain substantial proportions of alkyl-substituted benzene carboxylic acids having at least one carboxyl substituent on the benzene nucleus of each molecule of these acids, which may be any of the several monobasic isodurylic acids, etc. Salts prepared by neutralizing these organic acid product mixtures, being more soluble in water than isodurene, can be successfully employed as intermediate materials for a further second-stage oxidation with the aid of (1) a water-soluble sulfate, (2) elemental sulfur or a sulfur-compound containing sulfur at a valence below plus 6, and, (3) water to yield an organic acid product containing a substantial proportion of trimesic acid. This two-stage operation is illustrated by Example II.

EXAMPLE II

Isodurene (258.8 g.) was subjected to a partial oxidation in a glass turbo-reactor at a temperature of 260° F. under atmospheric pressure, and in the presence of 0.2 g. of cobalt naphthenate oxidation catalyst, by feeding through the isodurene charge a stream of air at a rate of 69.3 liters per hour. The reaction was interrupted in 2 hrs. 40 min. The oxidate was extracted with caustic under such conditions as to minimize saponification of the neutral ester fraction. The final partial oxidation product was predominantly a mixture of sodium salts of monobasic trimethyl benzoic (isodurylic) acids weighing 76.3 g., which figure corresponded to a yield of aromatic acids of about 66.3%.

This isodurylic acid product was then converted by a conventional technique, employing dilute ammonia, to the ammonium salt, and a 46.8 g. charge of the resulting ammonium isodurylate was placed into the same autoclave as in Example I together with 77 g. of ammonium sulfate, 10 g. of hydrogen sulfide, and 1000 g. of water. The autoclave was sealed, the temperature raised to 625° F. and maintained at this level for one hour. At that time, the pressure on the autoclave read 2425 p. s. i. g. When the heating was discontinued, and the contents of the autoclave cooled to room temperature, a crude acid product weighing 41.3 g. was recovered. It had a neutral equivalent of 82.5 and a saponification equivalent of 82.6. Conversion of ammonium isodurylate was 100% complete. A portion of the acid product was esterified with methanol, yielding 10.34 g. of an ester product with a saponification equivalent of 92.1. The esterification was 88.6% complete. 32.1% by weight of the ester product was trimethyl trimesate, this figure corresponding to an overall yield of trimesic acid equal to at least 23%, the total yield of aromatic acids being 91.2 mol percent of the theory.

As indicated above, the process of the invention is most desirably conducted by charging the poly-substituted benzene, such as isodurene, a water-soluble sulfate, a water-soluble sulfide, and water to a reaction zone, and there heating the mixture to an elevated temperature to effect conversion of the substituted benzene to unsubstituted benzene polycarboxylic acids having a number of carboxyl groups smaller than the number of substituents on the benzene nucleus in the charging stock. Materials which have been found effective in the process are shown in the following table, where a number of operative combinations of these materials is listed.

*Table*

1. Elemental sulfur, $(NH_4)_2SO_4$, water
2. Hydrogen sulfide, $(NH_4)_2SO_4$, water
3. Hydrogen sulfide, $Na_2SO_4 + NH_3$, water
4. Hydrogen sulfide, $K_2SO_4 + NH_3$, water
5. $(NH_4)_2S$, $(NH_4)_2SO_4$, water
6. $(NH_4)_2SO_3$, $(NH_4)_2SO_4$, water
7. $(NH_4)_2S_x$,[1] $(NH_4)_2SO_4$, water
8. $(NH_4)_2S$, $Na_2SO_4$, water

[1] $x > 1$.

Experiments indicate that no appreciable oxidation by the oxidizing agents of the invention occurs at temperatures below 500° F. At temperatures above 550° F. the reaction proceeds and its rate and vigor increase as the temperature is raised. Temperatures above the critical temperature of water are not employed, since it appears that the presence of water in liquid phase is necessary if appreciable yields of acidic products are to be obtained. The reaction may be conducted at temperatures above about 500° F. and below the critical temperature of water, and preferably at temperatures in the range from 550° F. to 650° F.

At these temperatures the maintenance of a superatmospheric pressure in the reaction zone is required in order to hold a part of the water in liquid phase. The pressures employed are usually in the range from about 1000 to 4000 p. s. i. g.

Reaction times from about 30 minuts to about 6 hours may be employed. Shorter reaction times are employed at higher temperatures, and conversely. Long reaction times at the higher temperatures within the above temperature range result in low yields of acidic products and higher conversions of the hydrocarbon material to carbon dioxide and water if an excess of oxidizing agent is present.

The reaction may be conducted either batch-wise as in the tabulated examples or in a continuous manner. A reaction system consisting of a reactor section of 40 feet of stainless steel tubing wound as a coil and immersed in a molten metal bath has been found suitable for conducting the process of the invention continuously at bench scale. The coil is connected to a surge vessel back-pressured with nitrogen gas to maintain suitable operating pressures. Batch oxidations are conducted in a shaker bomb capable of withstanding about 5000 pounds pressure.

Whether the reaction be conducted batch-wise or continuously, the greater portion of the reaction product is recovered in the form of either the salt of a benzene carboxylic acid or in the form of an acid amide. The free acids are readily recovered by heating the reaction product with a strong acid such as sulfuric acid or hydrochloric acid to hydrolyze the amides and ammonium salts. The free acids are then recovered from the acidified reaction product mixture usually by filtration.

Sulfate ion is the effective oxidizing agent in the process of the invention. The oxidation of isodurene proceeds pursuant to the following equation:

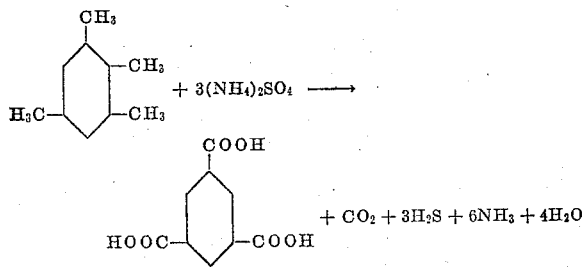

In general, a methyl group attached to an aromatic nucleus is oxidized pursuant to the following equation:

$$R-CH_3 + .75\ SO_4^{=} \rightarrow RCOOH + .75\ S^{=} + H_2O$$

Where the alkyl substituent contains more than one carbon atom (as it would be the case of 1,2,3,5-tetraalkyl substituted benzenes in which all four substituents or any one of them may be ethyl, propyl or butyl radicals having at least one hydrogen atom attached to the α-carbon), larger amounts of the sulfate oxidizing agent are required to convert the alkyl group to a carboxyl group, as indicated by the following equation:

$$R-CH_2 \cdot CH_3 + 1.5\ SO_4^{=} \rightarrow RCOOH + CO_2 + 1.5\ S^{=} + 2H_2O$$

While ammonium sulfate is the preferred sulfate for use as the oxidizing agent in the process of the invention, other water-soluble sulfates such as sodium sulfate, potassium sulfate, aluminum sulfate, lithium sulfate and ferrous sulfate may be employed.

A relatively small amount of a sulfur compound containing sulfur at a valence below plus 6 should be present in the reaction mixture as a triggering agent or initiator of oxidation if high rates of reaction are to be obtained. It is preferred to employ a small amount of hydrogen sulfide, ammonium sulfide or ammonium polysulfide for this purpose.

The amount of sulfate desirably present in the reaction mixture is indicated by the equations shown above. It is desirable to employ about 10% molar excess of sulfate over the quantity stoichiometrically required to oxidize the feed.

While the equations do not show water as a material participating in the reaction, the presence in considerable amount is necessary for good conversions and yields. For good operation it is desirable to charge at least 25 mols of water per mol of organic feed to the reaction zone. 30 to 60 mols of water per mol of organic feed usually facilitate good conversions and yields, and even larger quantities of water may be employed if desired. When partial oxidation products are employed for the production of benzene polycarboxylic acids, such as trimesic acid, the amounts of water can be less than those required for the oxidation of polyalkyl benzene hydrocarbons.

The sulfide component of the reaction mixture serves to increase the rate of reaction. The effective oxidizing agent of course is the sulfate ion, but its effectiveness, especially from the standpoint of rate, is markedly increased by the sulfide. The amount of sulfide charged to the reaction zone is desirably in the range from 0.05 to 0.3 mol per mol of organic compound, and preferably in the range from 0.2 to 0.25 mol per mol of organic feed. These amounts are required to set the reaction under way; as it continues, they will become larger due to the conversion of the sulfate ion to additional sulfide.

Obviously, many and varied modifications of the invention hereinbefore described may be made withoue departing from the spirit and scope thereof.

I claim:

1. A process for oxidizing an organic material selected from the group consisting of isodurene and isodurylic acid to produce a mixture of benzene carboxylic acids containing a substantial proportion of trimesic acid, which comprises: introducing into a reaction zone said organic material, water, a water-soluble sulfate as the oxidizing agent for said organic material, and a minor amount of a water-soluble sulfur compound containing sulfur at a valence below plus 6; and heating the reaction mixture to a temperature about 500° F.

2. A process for oxidizing an organic material selected from a group consisting of isodurene and isodurylic acid to produce a mixture of benzene carboxylic acids containing a substantial proportion of trimesic acid, which comprises: introducing into a reaction zone said organic material, water, a water-soluble sulfate as the oxidizing agent for said organic material, and a water-soluble sulfide in an amount from about 0.05 mol to about 0.3 mol per each mol of said organic material; and heating the reaction mixture to a temperature above 500° F.

References Cited in the file of this patent

UNITED STATES PATENTS 2,610,980     Naylor _____ Sept. 16, 1952

UNITED STATES PATENT OFFICE
CERTIFICATE OF CORRECTION

March 3, 1959

Patent No. 2,876,257     William G. Toland

It is hereby certified that error appears in the printed specification of the above numbered patent requiring correction and that the said Letters Patent should read as corrected below.

Column 5, line 7, for "about 500° F." read -- above 500° F. --.

Signed and sealed this 14th day of July 1959.

(SEAL)
Attest:

KARL H. AXLINE
Attesting Officer

ROBERT C. WATSON
Commissioner of Patents